(12) United States Patent
Williams

(10) Patent No.: US 7,011,239 B2
(45) Date of Patent: Mar. 14, 2006

(54) TELESCOPING ROOF BASKET ASSEMBLY FOR A VEHICLE

(75) Inventor: Bruce Preston Williams, Grosse Pointe Park, MI (US)

(73) Assignee: Ford Global Technologies LLC, Dearborn, MI (US)

(*) Notice: Subject to any disclaimer, the term of this patent is extended or adjusted under 35 U.S.C. 154(b) by 262 days.

(21) Appl. No.: 10/249,269

(22) Filed: Mar. 27, 2003

(65) Prior Publication Data

US 2004/0188478 A1 Sep. 30, 2004

(51) Int. Cl.
*B60R 9/00* (2006.01)
*B60R 9/042* (2006.01)

(52) U.S. Cl. .............. 224/310; 224/310; 224/319; 224/321

(58) Field of Classification Search .............. 224/310, 224/309, 325, 330, 319, 321, 314, 315, 316, 224/281, 282, 485, 328, 492, 495; 414/462
See application file for complete search history.

(56) References Cited

U.S. PATENT DOCUMENTS

| | | | | | |
|---|---|---|---|---|---|
| 3,596,788 | A | * | 8/1971 | Willie | 414/462 |
| 3,756,648 | A | * | 9/1973 | Greif | 296/157 |
| 3,963,136 | A | | 6/1976 | Spanke | |
| 4,223,689 | A | * | 9/1980 | Cox | 135/139 |
| 4,240,571 | A | | 12/1980 | Ernst | |
| 4,682,719 | A | | 7/1987 | Ernst et al. | |
| 4,757,929 | A | * | 7/1988 | Nelson | 224/329 |
| 5,417,358 | A | | 5/1995 | Haselgrove | |
| 5,423,650 | A | * | 6/1995 | Zerbst et al. | 414/462 |
| 5,535,929 | A | * | 7/1996 | Neill | 224/310 |
| 5,690,259 | A | * | 11/1997 | Montani | 224/310 |
| 5,782,391 | A | * | 7/1998 | Cretcher | 224/310 |
| 5,884,824 | A | * | 3/1999 | Spring, Jr. | 224/310 |
| 6,015,074 | A | * | 1/2000 | Snavely et al. | 224/310 |
| 6,308,874 | B1 | * | 10/2001 | Kim et al. | 224/310 |
| 6,338,427 | B1 | * | 1/2002 | Aftanas et al. | 224/310 |
| 6,425,508 | B1 | * | 7/2002 | Cole et al. | 224/320 |
| 6,681,970 | B1 | * | 1/2004 | Byrnes | 224/310 |
| 6,729,513 | B1 | * | 5/2004 | Kmita et al. | 224/320 |
| 6,761,296 | B1 | * | 7/2004 | Ford et al. | 224/310 |
| 6,827,244 | B1 | * | 12/2004 | Stapleton et al. | 224/310 |
| 2004/0173651 | A1 | * | 9/2004 | Kim et al. | 224/310 |

FOREIGN PATENT DOCUMENTS

| | | |
|---|---|---|
| DE | 4018-009 A | 5/1990 |
| FR | 2623-485 A | 12/1985 |
| JP | 261745 | 11/1987 |

* cited by examiner

*Primary Examiner*—Lee Young
*Assistant Examiner*—Ryan Hoesly
(74) *Attorney, Agent, or Firm*—Gigette M. Bejin; Artz & Artz P.C.

(57) ABSTRACT

A telescoping roof basket assembly (10) for attachment to a roof (12) of a vehicle (14) is provided. The basket assembly (10) includes a pair of rails (18) fixedly coupled to the roof (12) of the vehicle (14). Each rail (18) defines a primary channel (22) and a secondary channel (24). Furthermore, each primary channel (22) has an extension bar (26) slidably positioned therein for telescopically fitting the extension bar (26) to the rail (18). The extension bars (26) are capable of extending rearwardly from the rails (18). Moreover, these extension bars (26) are pivotally coupled to a front end portion of a moveable basket member (30). This moveable basket member (30) has a rear end portion with a pair of tabs (44) extending therefrom. These tabs (44) are intended for insertion into the secondary channels (24) and securing the moveable basket member (30) to the rails (18). The telescoping roof basket assembly (10) is moveable between a roof mounted position and a back end mounted position.

18 Claims, 14 Drawing Sheets

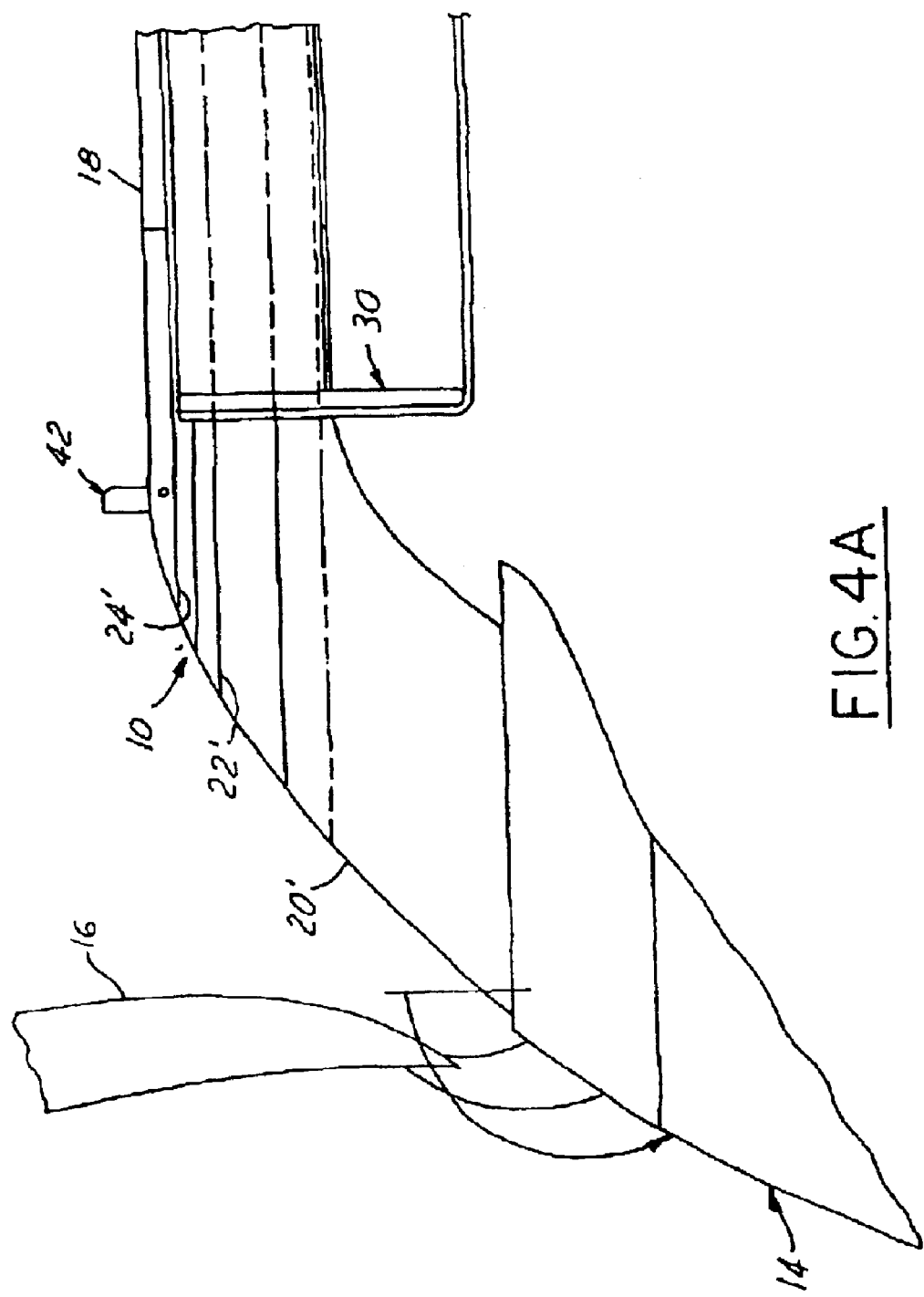

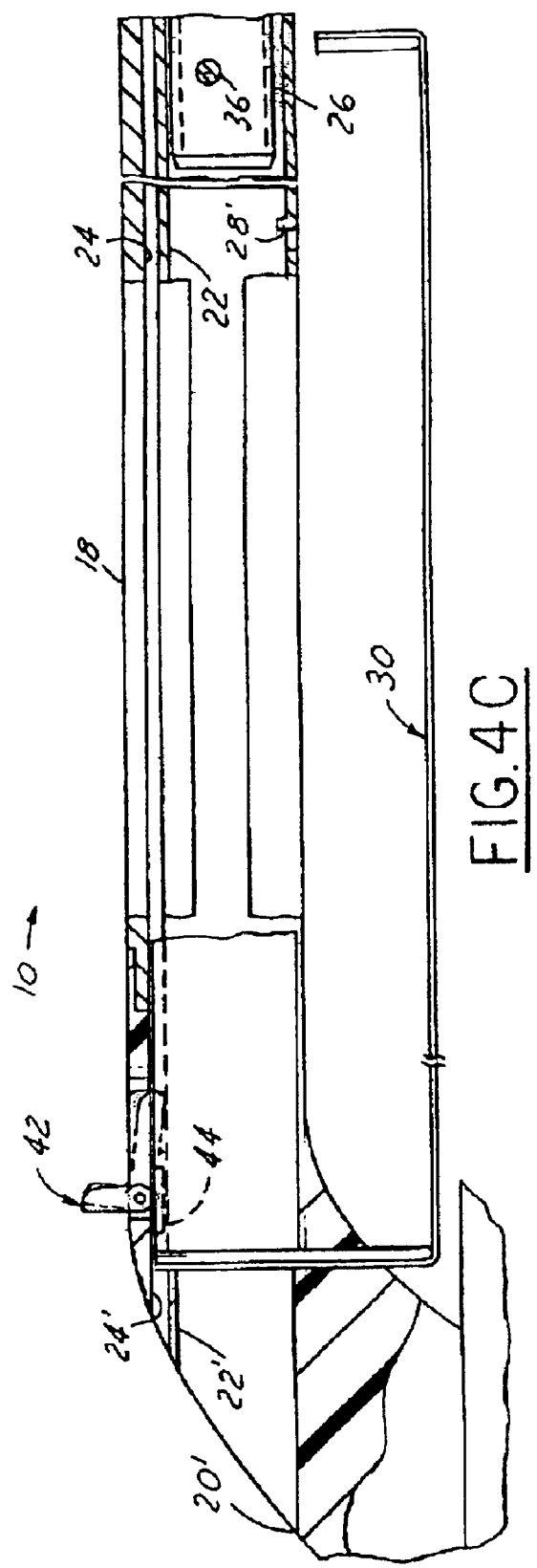

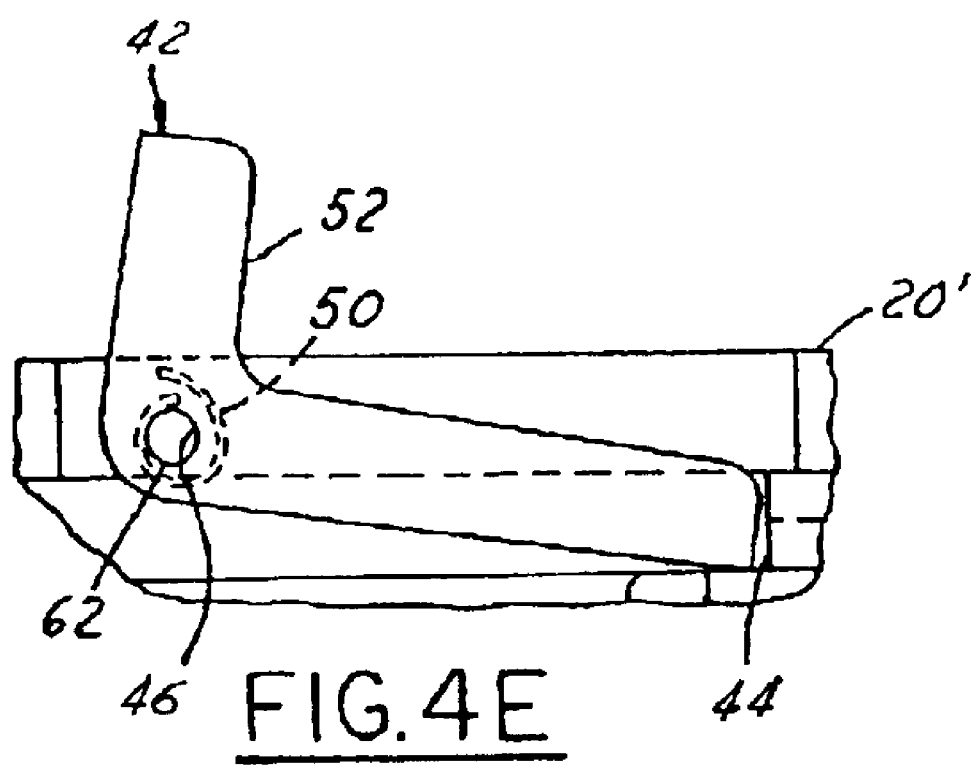

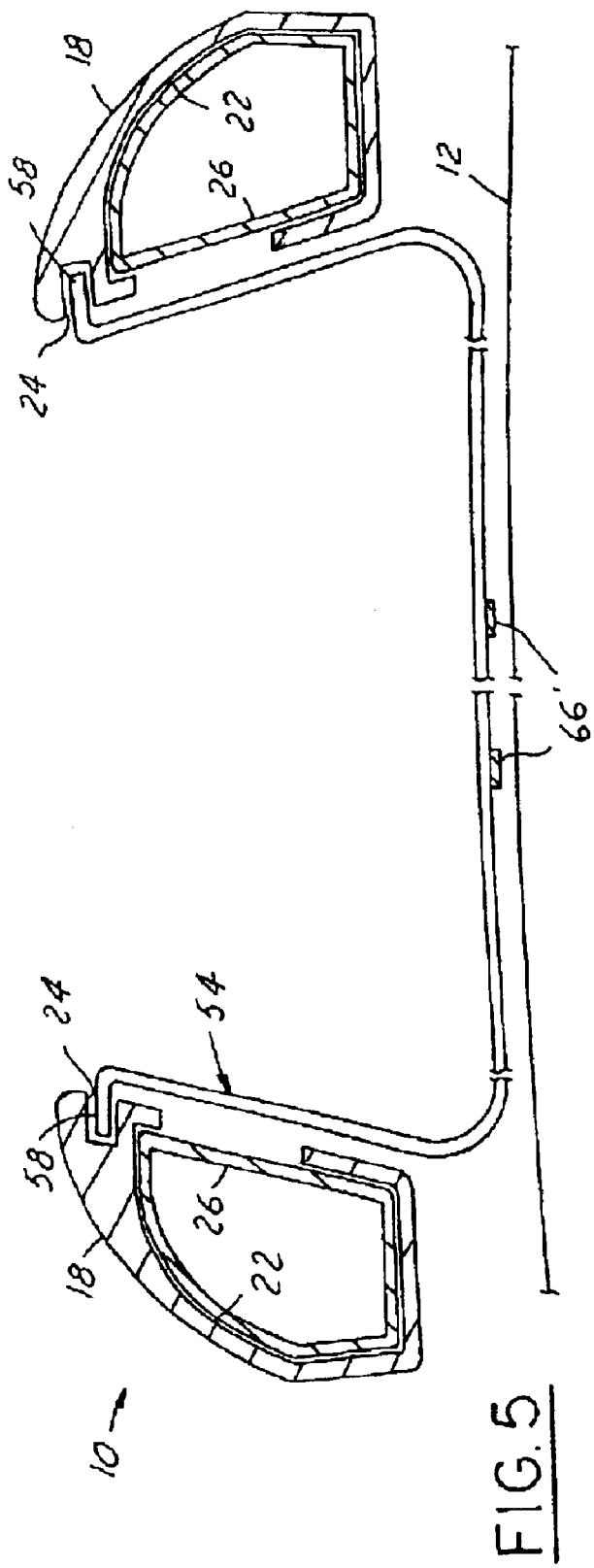

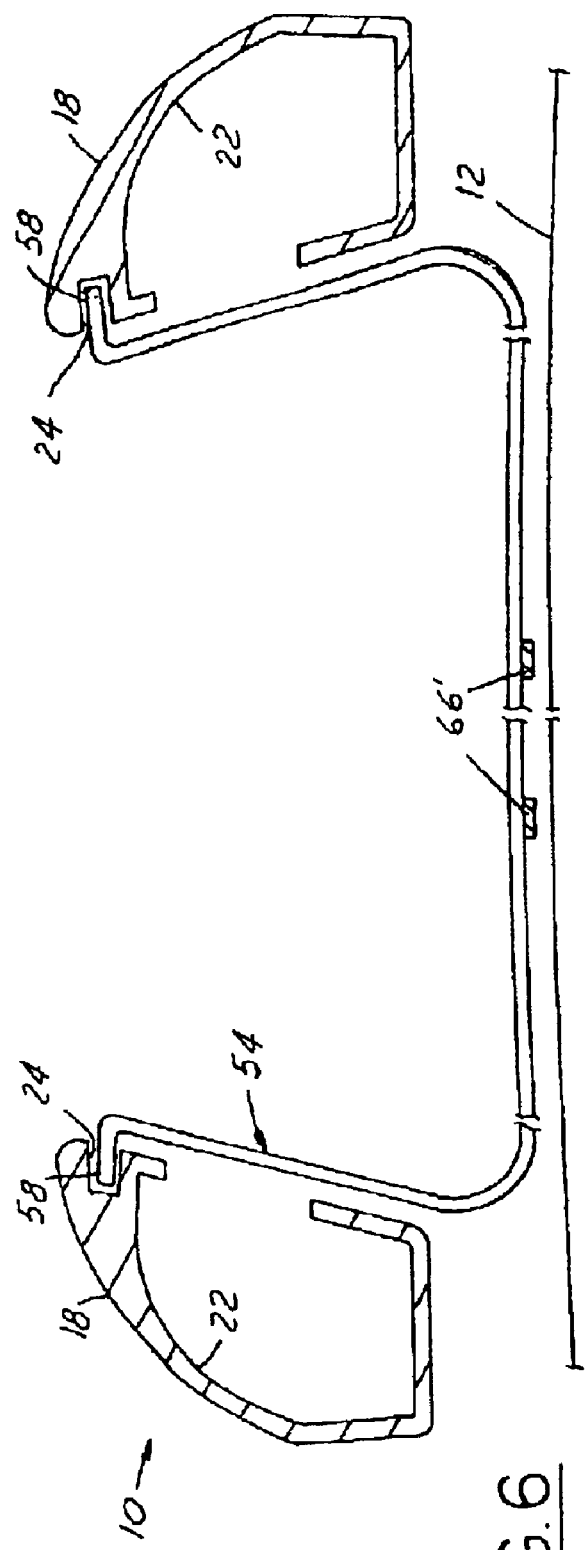

TELESCOPING ROOF BASKET ASSEMBLY FOR A VEHICLE

BACKGROUND OF INVENTION

The present invention relates generally to vehicles, and more particularly to roof rack assemblies for vehicles.

Roof rack assemblies for securing various objects to the roofs of vehicles are well known. Typical roof rack assemblies are carrier frames fixedly attached to the roof. The roofs of many vehicles, i.e. sport utility vehicles, can be located at a relatively tall height from the ground and therefore are difficult to reach. In this regard, it may be somewhat cumbersome for an individual to lift an item over his head, place it onto the roof of the vehicle, and secure it to the roof rack assembly.

A proposed solution that allows objects to be more easily mounted to a roof of a vehicle is disclosed in U.S. Pat. No. 6,308,874 (hereinafter referred to as the '874 patent). The '874 patent discloses a roof rack assembly for use in combination with the roof of a vehicle and a rear portion of the vehicle. The roof rack assembly includes a pair of elongated support rails fixedly attached to the roof of the vehicle. The rails have a moveable rack member that is moveably coupled thereto. This rack member can be moved between a "roof-mounted" position in which the rack member is substantially parallel to the roof and a "back end-mounted" position in which the rack member is substantially parallel to the back end.

The elongated rails extend over the rear edge of the roof so as to allow the rack member to move between the "roof-mounted" position and the "back end-mounted" position without interference from the top rear edge of the vehicle.

A drawback of this roof rack assembly is that the rear ends of these elongated rails can interfere with the proper operation of a rear liftgate of the vehicle. Rear liftgates are typically integrated within sport utility vehicles and minivans. These liftgates ordinarily swing open or closed on two or more hinges that are located at the top rear edge of the vehicle. As mentioned above, the rails disclosed in the '874 patent extend over the edge of the roof. In this regard, the rails may obstruct the movement of the rear liftgate and prevent the rear liftgate from being fully opened. Moreover, if the liftgate were opened, the rails may damage the rear liftgate or the rear window integrated within the liftgate. Such results clearly are undesirable.

Another drawback of this roof rack assembly is that the construction of the moveable rack member typically lacks mounting structures that are positioned in a sufficient number of orientations. For example, the construction of the moveable rack member can be substantially planar. In this regard, the moveable rack member can lack mounting structures that extend substantially perpendicularly from the plane in which the remaining structure is primarily located.

Furthermore, the rack member can lack a sufficient quantity of mounting structures for securing cargo to the vehicle. For instance, the rack member can merely include a pair of elongated tube members and four traversing cross members attaching the tube members together.

For these reasons, an individual may be required to meticulously position an item on the rack member within a precise location for properly securing the item to the relatively few mounting structures of the rack member. Moreover, this construction may even completely prevent smaller items from being mounted to the rack member. As a result, the construction of the rack member clearly is disadvantageous.

Therefore, it would be desirable to provide an easily accessible roof-mounted carrier assembly for permitting relatively easy attachment of various items thereon, as well as for utilizing the carrier assembly on a variety of vehicles, i.e. vehicles with rear liftgates.

SUMMARY OF INVENTION

The present invention provides a telescoping roof basket assembly for attachment to a roof of a vehicle. The basket assembly includes a pair of rails fixedly coupled to the roof of the vehicle. These rails are positioned substantially parallel to each other and generally along a longitudinal axis of the vehicle. Each rail defines a primary channel and a secondary channel. Furthermore, each primary channel has an extension bar slidably positioned therein and telescopically fitted to the rail. These extension bars are capable of being extended rearwardly from the rails. Moreover, these extension bars are pivotally coupled to a front end portion of a moveable basket member. This moveable basket member has a rear end portion with a pair of tabs extending therefrom. These tabs are intended for insertion into the secondary channels and securing the moveable basket member to the rails.

The telescoping roof basket assembly is moveable between a roof mounted position and a back end mounted position. In the roof mounted position, the moveable basket member is structured with a relatively small cross-section so as to create a low profile of the basket assembly and minimize drag imparted upon the vehicle. In addition, in the roof mounted position, the basket assembly is substantially parallel to the roof and is confined within a space directly above the roof. In the back end mounted position, the moveable basket member is substantially parallel to the back end of the vehicle.

One advantage of the present invention is that a telescoping roof basket assembly is provided that allows for unobstructed operation of a rear liftgate of the vehicle when the basket assembly is in a roof mounted position.

Another advantage of the present invention is that a moveable basket member is provided that includes a substantial quantity of mounting structures that are oriented in a substantial number of directions so as to facilitate the attachment of various shaped and various sized items thereon.

Yet another advantage of the present invention is that a telescoping roof basket assembly is provided that has a low profile structure and is positioned substantially close to the roof of the vehicle so as to minimize the drag forces imparted upon the vehicle.

Still another advantage of the present invention is that a telescoping roof basket assembly is provided that facilitates the loading and the unloading of various items to the roof of a vehicle.

Yet another advantage of the present invention is that a telescoping roof basket assembly is provided that has a secondary channel for securing a variety of modular components, i.e. a cargo carrier and a stationary basket member, thereto.

Other advantages of the present invention will become apparent when viewed in light of the detailed description of the invention when taken in conjunction with the attached drawings and appended claims.

BRIEF DESCRIPTION OF DRAWINGS

For a more complete understanding of this invention, reference should now be made to the embodiments illustrated in greater detail in the accompanying drawings and described below by way of examples of the invention:

FIG. 4A is a side view of the telescoping roof basket assembly shown in FIG. 1, as taken along line 4A—4A, illustrating unrestricted operation of a rear liftgate of the vehicle.

FIG. 4C is a partially cutaway view of the telescoping roof basket assembly, illustrating the basket assembly being placed in the roof mounted position according to one embodiment of the present invention.

FIG. 4E is a magnified view of the exemplary locking mechanism shown in FIG. 4D, as taken within circle 4E.

FIG. 5 is a cross-sectional view of the telescoping roof basket assembly shown in FIG. 1, as taken along line 5—5.

FIG. 6 is a cross-sectional view of the telescoping roof basket assembly shown in FIG. 2, as taken along line 6—6.

FIG. 9 is a perspective view illustrating the attachment of a stationary basket member and a cargo carrier to the rails of a telescopic roof basket assembly, according to one embodiment of the present invention; and.

DETAILED DESCRIPTION

Figure 1:
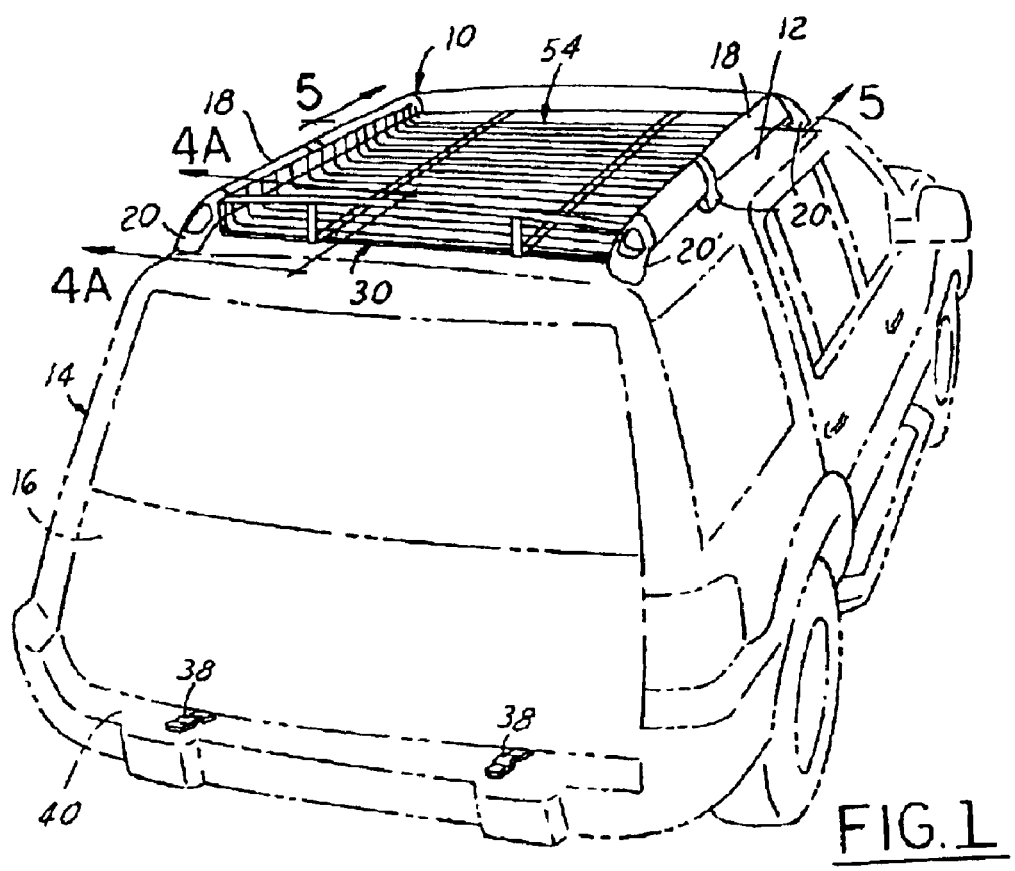
FIG. 1 is a perspective view of a telescoping roof basket assembly that is attached to a roof of a vehicle and placed in a roof mounted position, according to one embodiment of the present invention.

In the following figures, the same reference numerals are used to identify the same components in the various views.

Figure 2:
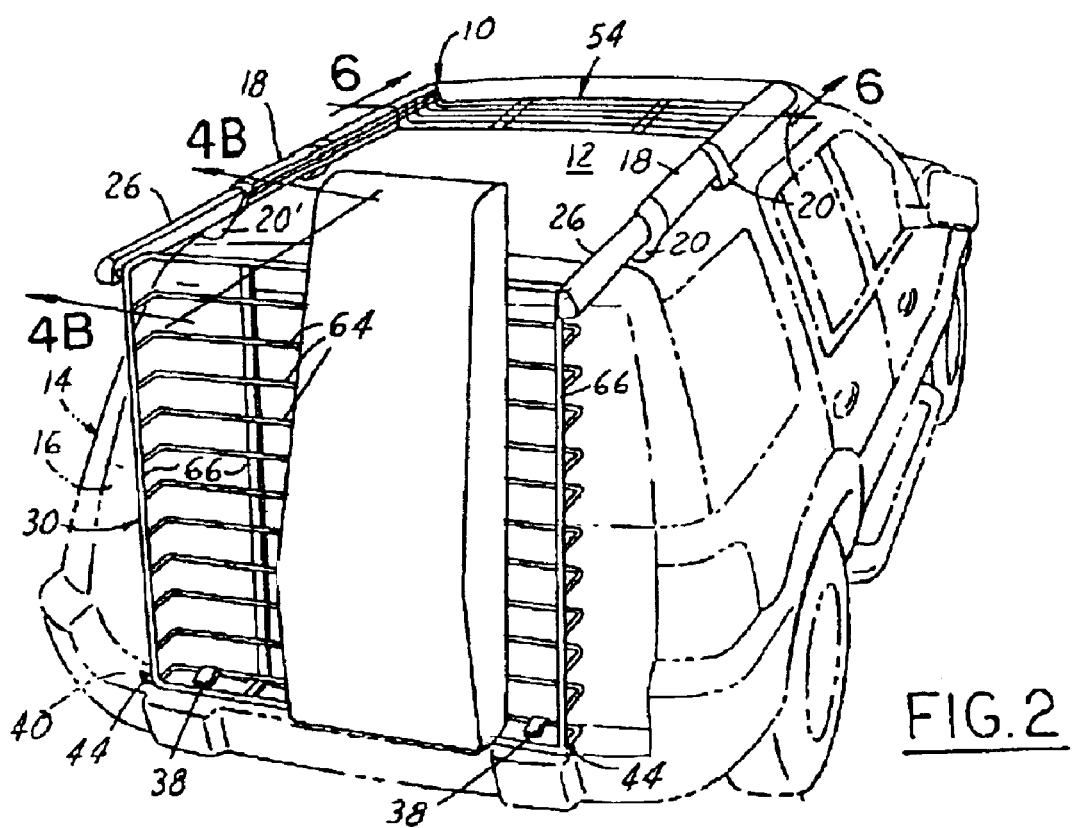
FIG. 2 is a perspective view of the telescoping roof basket assembly, as shown in FIG. 1, that is placed in a back end mounted position.
Figure 3:
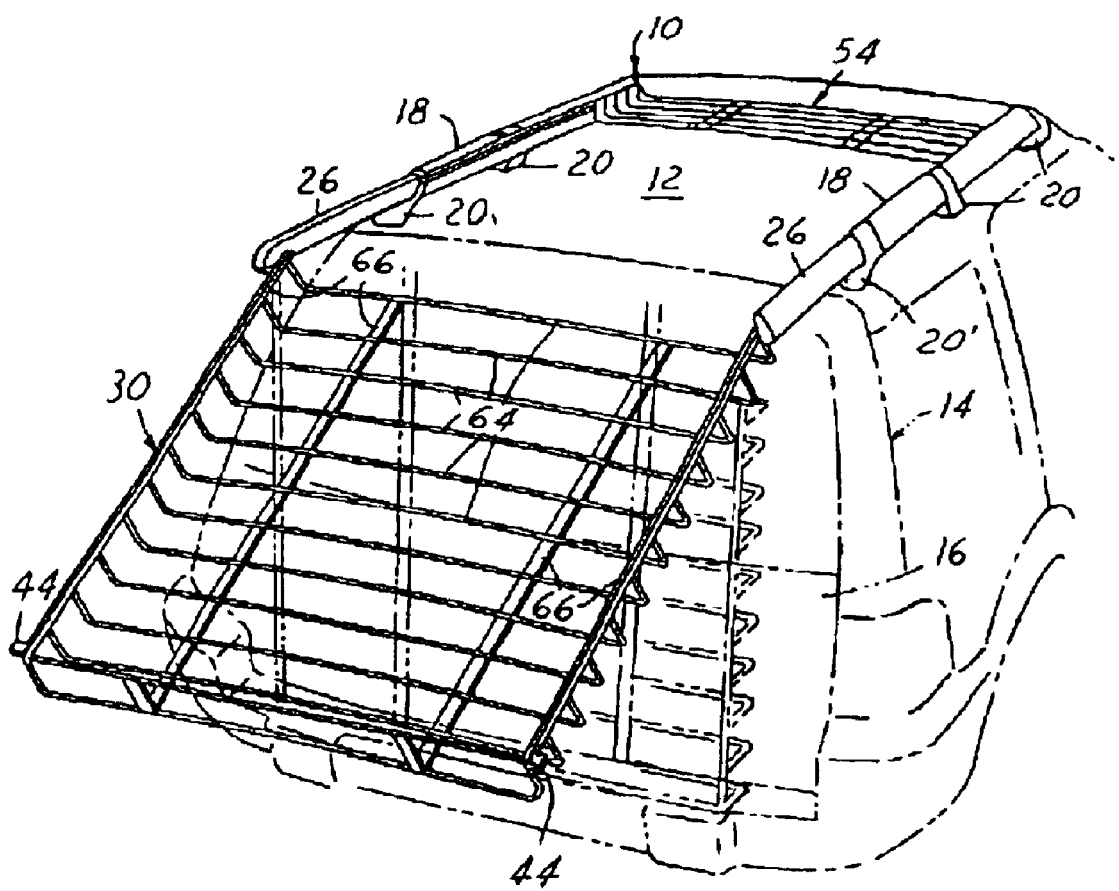
FIG. 3 is a perspective view of the telescoping roof basket assembly shown in FIGS. 1 and 2, illustrating movement of the basket assembly between the roof mounted position and the back end mounted position.

Referring to FIGS. 1–3, there are shown perspective views of a telescoping roof basket assembly 10 (hereinafter referred to as "basket assembly") that is moveable between a roof mounted position (as shown in FIG. 1) and a back end mounted position (as shown in FIG. 2). FIG. 3 generally illustrates the movement of the basket assembly 10 between the roof mounted position and the back end mounted position.

The movement of the basket assembly 10 between these two positions facilitates a user in securing various items to the roof 12 of a vehicle 14. Specifically, a user can readily access the basket assembly 10 and secure items thereto when the basket assembly 10 is placed in the back end mounted position. With the basket assembly 10 in this position, the user can easily reach a substantial portion of the basket assembly 10 and secure an item thereon. In this regard, the user does not have to lift an item over his head, place it onto the roof, and reach around the roof to secure the item to the basket assembly 10. Once all the items are secured to the basket assembly 10, the user may move the basket assembly 10 to the roof mounted position.

As best shown in FIGS. 2 and 3, the moveable basket member 30 is a basket-like storage unit. Specifically, this storage unit is comprised of a series of parallel bars 64 with two or more support bars 66 that are fixedly coupled to the parallel bars 64 and positioned generally perpendicular to the parallel bars 64. Furthermore, the parallel bars 64 have end portions that extend substantially perpendicularly from the plane in which the center portions of the parallel bars are located. All of these bars 64, 66 are intended to provide for a substantial number of attachment points for various gear-specific retaining systems, e.g. bike mounts and kayak mounts.

Preferably, the moveable basket member 30 is comprised of at least four metal support bars 66 with a series of metal parallel bars 64 welded thereto. However, it is understood that the moveable basket member 30 can be comprised of various other suitable materials as desired and have a variety of other suitable configurations.

As shown in FIGS. 1 and 4A, in the roof mounted position, the basket assembly 10 is located in a discrete space directly above the roof 12 of the vehicle 14. In other words, the basket assembly 10 does not obstruct a rear region of the vehicle 14. A benefit of this construction is that the rear region can be freely utilized without interference from the basket assembly 10. For example, the basket assembly 10 can permit a rear liftgate 16 of the vehicle 14 to swing fully open without striking a rear portion of the basket assembly 10. However, it is also understood that the unobstructed rear region of the vehicle 14 can provide for a variety of other uses as desired.

Moreover, in the roof mounted position, the basket assembly 10 has a low profile and a substantially small cross-section (as best shown in FIG. 5), which can decrease the amount of drag forces imparted upon the vehicle 14.

In one embodiment of the invention, the basket assembly 10 includes a pair of rails 18 that are fixedly attached to the roof 12 of the vehicle 14. These rails 18 are positioned substantially parallel to each other and generally along a longitudinal axis of the vehicle 14. Moreover, the length of each rail 18 is confined to a space directly above the roof 12. For this reason, no portion of the rail 18 protrudes into a space above or within a rear region of the vehicle 14.

Furthermore, each rail 18 has one or more leg portions 20 extending therefrom for attaching the rail 18 to the roof 12. However, it is understood that various other suitable structures may be utilized to attach the rails 18 to the roof 12. Alternatively, the rails 18 themselves may be directly attached to the roof 12.

Referring now to FIGS. 5 and 6, there are shown cross-sectional views of the rails 18 shown, respectively, in FIGS. 1 and 2, as taken along lines 5—5 and 6—6. Each rail 18 defines a primary channel 22 and a secondary channel 24. The secondary channel 24 is detailed in the descriptions for FIGS. 4C–4E and 9.

The primary channels 22 extend substantially across the length of the rails 18 and are sized for having extension bars 26 slidably disposed therein. The extension bars 26 are telescopically fitted to the rails 18 in order to allow the extension bars 26 to extend rearwardly from the rails 18.

Figure 4B:
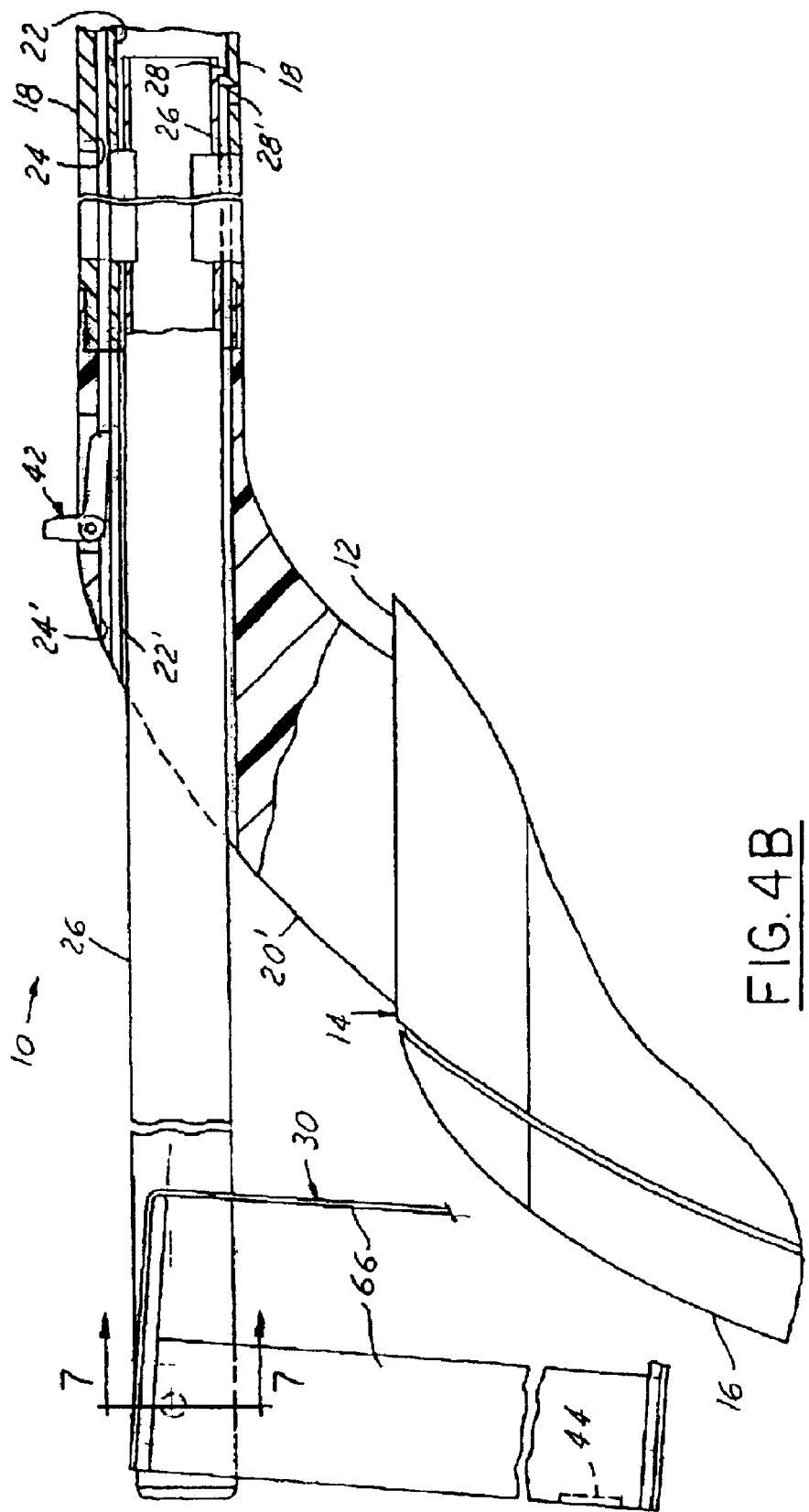
FIG. 4B is a partially cutaway view of the telescoping roof basket assembly shown in FIG. 2, as taken along line 4B—4B.

Referring now to FIG. 4B, there is shown a partially cutaway view of the basket assembly 10 shown in FIG. 2, as taken along line 4B—4B. The front end portions of the extension bars 26 and the rear end portions of the rails 18 have opposing detent flanges 28, 28' for preventing the extension bars 26 from being completely extracted from the primary channels 22 of the rails 18. These flanges 28, 28' are sections of the extension bars 26 and the rails 18 that are respectively bent radially outwardly and inwardly. One skilled in the art will understand that a variety of other suitable detent couplings or anti-separation mechanisms may provide for a telescopic fitting between the extension bars 26 and the rails 18.

Figure 7:
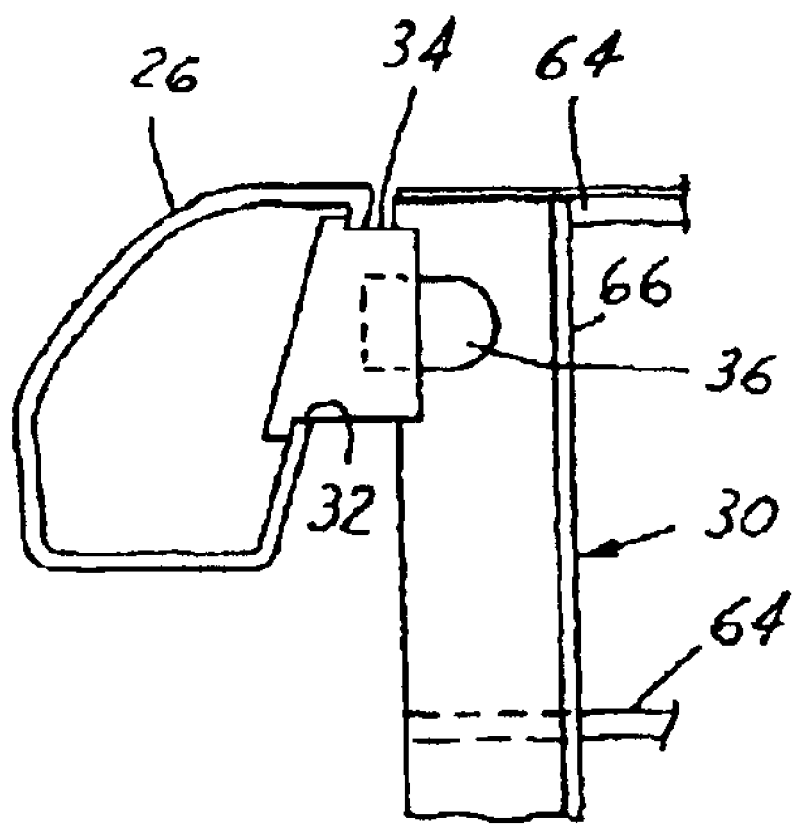
FIG. 7 is a partially cutaway view of a pivotal coupling between a moveable basket member and an extension bar shown in FIG. 4B, taken along line 7—7.

Referring now to FIGS. 4B and 7, the rear end portions of these extension bars 26 are pivotally coupled to a front end portion of a moveable basket member 30. Specifically, each extension bar 26 has a hole 32 integrally formed therein with a bushing 34 secured to the extension bar 26 within the hole 32. This bushing 34 is intended to receive a mandrel 36 extending laterally outward from the moveable basket member 30. This construction permits the moveable basket member 30 to pivot about its mandrels 36 between a substantially horizontal position and a substantially vertical position.

Each mandrel 36 is an integral part of the moveable basket member 30. Alternatively, the mandrels can be separate components that are attached to the moveable basket member 30. Moreover, it is understood that a variety of other suitable mechanisms may be utilized for providing the pivotal coupling between the moveable basket member 30 and the extension bars 26.

Figure 8:
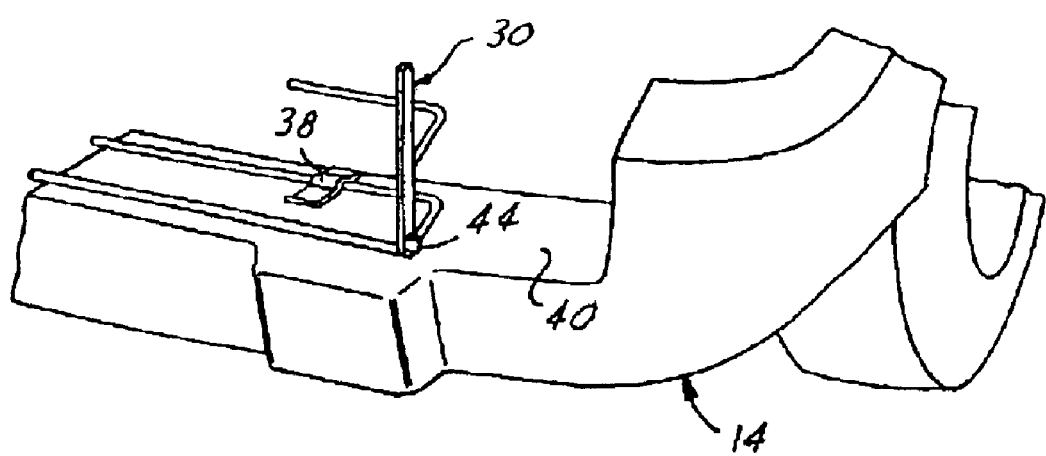
FIG. 8 is a perspective view of an exemplary fastener for holding a telescoping roof basket assembly in a back end mounted position, according to one embodiment of the present invention.

Referring now to FIG. 8, there is shown an exemplary fastener 38 for securing the basket assembly 10 to a vehicle 14 in a back end mounted position, in accordance with one embodiment of the invention. This fastener 38 is fixedly attached to the vehicle 14 adjacent to a rear bumper 40 of the vehicle 14. The fastener 38 is a resilient clip for receiving a rear portion of the moveable basket member 30. However, one skilled in the art will understand that a variety of other suitable fasteners may be utilized as desired.

Figure 4D:
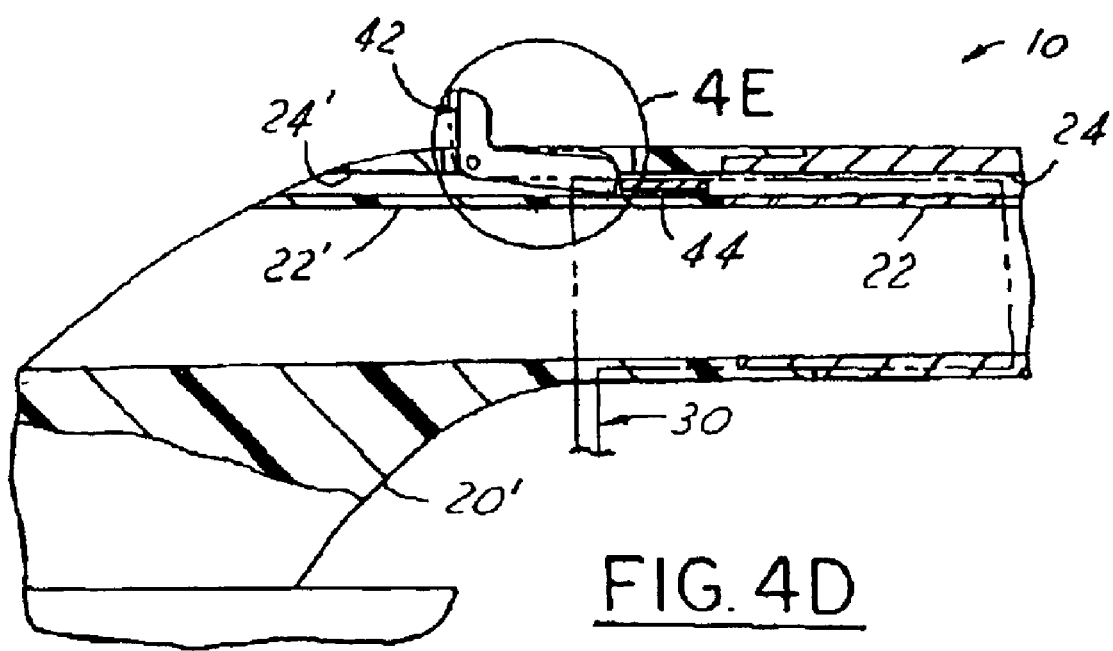
FIG. 4D is a partially cutaway view of the telescoping roof basket assembly, illustrating the basket assembly being locked in the roof mounted position according to one embodiment of the present invention.

Referring now to FIGS. 4C–4E, there is shown partially cutaway views illustrating the operation of an exemplary locking mechanism 42 for selectively locking the moveable basket member 30 in the roof mounted position and releasing the basket member 30 therefrom. Specifically, the moveable basket member 30 has a rear end portion with a pair of tabs 44 extending laterally outward therefrom. These tabs 44 are intended for insertion into the secondary channels 24 of the rails 18 for the purpose of selectively engaging the locking mechanism 42 and preventing the moveable basket member 30 from sliding rearward and out of the rails 18. However, it is understood that the moveable basket member 30 may have additional tabs, a continuous ledge, or other suitable protrusions for insertion into the secondary channel 24.

Additionally, the tabs 44 are also intended to support the moveable basket member 30 in a substantially upright direction. In this regard, in the roof mounted position, the moveable basket member 30 is supported by the tabs 44 in its rear end portion and by the mandrels 36 in its front end portion. However, it is understood that the basket member 30 can be supported by a variety of support members as desired.

The locking mechanism 42 is integrated within a secondary channel 24' of a rear leg portion 20'. However, it is understood that the locking mechanism 42 may instead be integrated within the secondary channel 24 of the rail 18 as desired.

The locking mechanism 42 is an L-shaped bracket 48 with an opening 46 integrally formed therein for receiving a pin 62 and pivotally coupling the bracket 48 to the rail 18. In addition, a spring 50 is coupled between the rail 18 and the bracket 48 so as to bias the bracket 48 to close the secondary channel 24. A user may selectively release the moveable basket member 30 from the roof mounted position by pressing a lever portion 52 of the bracket 48 and pulling the moveable basket member 30 rearwardly. As a result, the tabs 44 may pass beyond the locking mechanism 42 and the moveable basket member 30 can be pulled out rearwardly from the rails 18.

Figure 9:
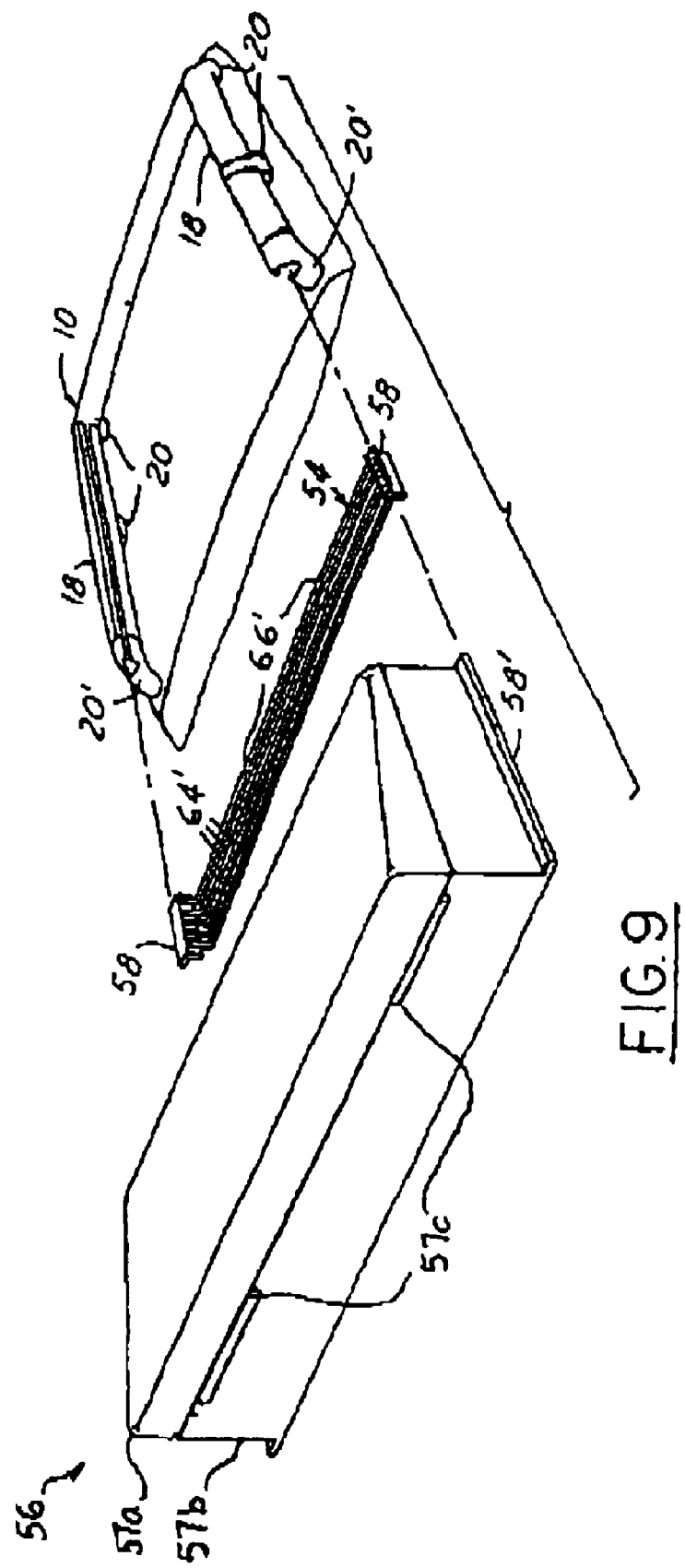

Referring now primarily to FIGS. 5, 6, and 9, the secondary channel 24 is intended to secure a variety of modular components, e.g. a stationary basket member 54 and a cargo carrier 56, to the rails 18. This secondary channel 24 does not overlap the primary channel 22 and therefore permits the modular components to remain in position as the moveable basket member 30 is moved between the roof mounted position and the back end mounted position. In this respect, the secondary channel 24 is independent from the primary channel 22.

The stationary basket member 54 preferably has a similar construction as the moveable basket member 30 for the purpose of allowing a variety of different shaped and different sized items to be mounted on the stationary basket member 54. Specifically, the stationary basket member 54 is a basket-like storage unit including four support bars 66' with a series of parallel bars 64' attached to the support bars 66'. However, it is understood that the stationary basket member 54 can have various other suitable configurations as desired.

Furthermore, this stationary basket member 54 includes a pair of ledges 58 that are intended to be inserted into the secondary channels 24. In this regard, a user can attach the stationary basket member 54 to the front end portion of the basket assembly 10 by first inserting the ledges 58 into the secondary channel 24 at the rear end portion of the basket assembly 10 and then sliding the stationary basket member 54 to the front end portion of basket assembly 10.

Additionally, the stationary basket member 54 can be utilized for complementing the moveable basket member 30 and providing a continuous additive length to the basket assembly 10. This continuous additive length allows lengthy items to be secured to the basket assembly.

For example, the stationary basket member 54 can be sized one third the length of the basket assembly 10, and the moveable basket member 30 can be sized two thirds the length of the basket assembly 10. In view of this construction, an item, such as a kayak, that is sized the length of the basket assembly 10 can be first secured to the moveable basket member 30 when the basket assembly 10 is in the back end mounted position. Then, once the basket assembly 10 is moved to the roof mounted position, the item can be secured to the stationary basket member 54.

It is understood that the moveable basket member 30 and the stationary basket member 54 allow for a modular arrangement of the basket assembly 10. For example, the lengths of the stationary basket member 54 and the moveable basket member 30 can vary as desired. In addition, according to another example, the basket assembly 10 may completely replace the moveable basket member 30 with a stationary basket member 54 that is sized the length of the basket assembly 10. According to yet another example, the basket assembly 10 may replace the moveable basket member 30 with two stationary basket members 54 that together are sized the length of the basket assembly 10. According to still another example, the basket assembly 10 may replace the stationary basket member 54 with a moveable basket member 30 that is sized the length of the basket assembly 10. Despite all of the above examples, it is understood that the basket assembly 10 can have a variety of other suitable configurations as desired.

As introduced above and shown in FIG. 9, the cargo carrier 56 is another example of a modular component for attachment to the secondary channels 24 of the rails 18. The cargo carrier 56 has a pair of protrusions 58' for insertion into the secondary channels 24 and coupling the carrier 56 to the rails 18 of the basket assembly 10. However, it is understood that the carrier 56 may instead be secured to the moveable basket member 30 by cords or other mounting devices as desired.

This cargo carrier 56 is a two-piece construction that includes a lid portion 57a and a base portion 57b. The lid portion 57a is pivotally coupled to the base portion 57b by a suitable hinge mechanism 57c. The base portion 57b preferably has the protrusions 58' extending therefrom. However, it is understood that a variety of other suitable constructions of the carrier 56 can be utilized as desired.

In operation, the basket assembly 10 is moveable from the roof mounted position to the back end mounted position by first disabling the locking mechanism so as to permit the basket member 30 to move rearward. Thereafter, the moveable basket member 30 is pulled rearward, as well as the extension bars 26 attached to the basket member 30. In this respect, the basket member 30 and the extension bars 26 extend into the rear region of the vehicle 14 beyond the space directly above the roof of the vehicle 14. The extension bars 26 reach a limit of rearward movement when the detent flanges 28 integrated thereon engage opposing detent flanges 28' integrated on the rails 18. Then, the moveable basket member 30 is pivoted about its mandrels 36 that are coupled to the extension bars 26. This movement allows the basket member 30 to be secured to the fastener 38 on the rear bumper 40 and to position the basket member 30 substantially parallel to the back end of the vehicle 14.

Figure 10:
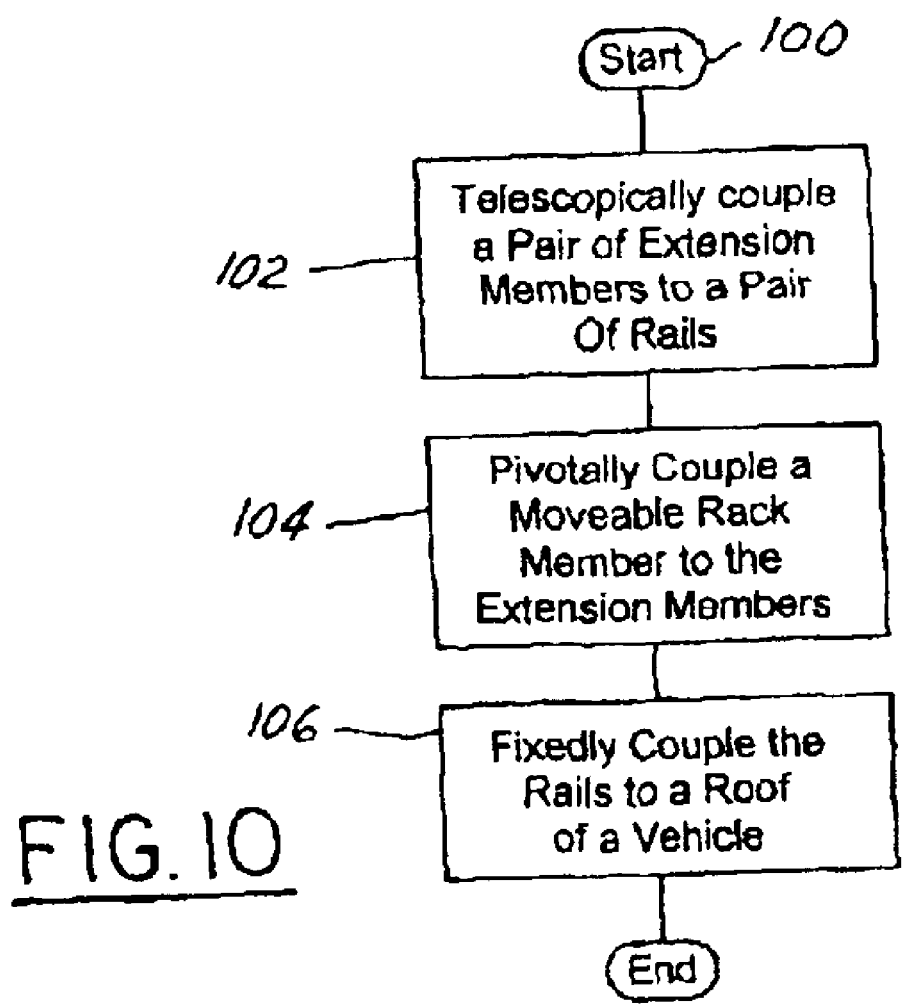
FIG. 10 is a logic flow diagram representing a method for manufacturing a telescoping roof basket assembly, according to one embodiment of the present invention.

Referring now to FIG. 10, there is shown a logic flow diagram illustrating a method for manufacturing a telescoping roof basket assembly 10 according to one embodiment of the present invention. The method begins at step 100 and then immediately proceeds to step 102.

In step 102, a pair of extension bars 26 are telescopically fitted to a pair of rails 18. This step may be accomplished by inserting the extension bars 26 into a pair of primary channels 22 integrally formed within the rails 18, which are sized for receiving the extension bars 26. Specifically, the extension bars 26 can be inserted into front end portions of the rails 18 through the length of the rails 18 until opposing detent flanges integrated on the rails 18 and the extension bars 26 prevent further rearward movement. Thereafter, the front end portions of the rails 18 may be enclosed by a leg portion 20 or other suitable cover for preventing the extension bars 26 from exiting the rails 18. However, one skilled in the art will understand that the telescopic fitting may be accomplished by other suitable methods as desired. Then, the sequence proceeds to step 104.

In step 104, a front end portion of a moveable basket member 30 is pivotally coupled to the rear end portions of the extension bars 26. This step may be accomplished by inserting mandrels 36 extending laterally outward from the basket member 30 into bushings 34 that are coupled to the extension bars 26. However, it is understood that a variety of other suitable pivotal couplings may be utilized as desired. Then the sequence proceeds to step 106.

In step 106, the pair of rails 18 are fixedly coupled to a roof 12 of the vehicle 14. These rails 18 may be attached to the roof 12 by two or more leg portions 20 extending downward from the rails 18. Alternatively, the rails 18 themselves may be directly attached to the roof 12. However, it is understood that the rails 18 may be attached to the roof by various other suitable methods.

While particular embodiments of the invention have been shown and described, numerous variations and alternate embodiments will occur to those skilled in the art. Accordingly, it is intended that the invention be limited only in terms of the appended claims.

What is claimed is:

1. A telescoping roof basket assembly of for a vehicle, comprising:
   a pair of rails fixedly coupled to a vehicle roof, said pair of rails having a pair of primary channels and a pair of secondary channels formed therein, said pair of primary channels extending substantially across a length of said pair of rails;
   a stationary basket member having a pair of ledges extending therefrom for inserting into said pair of secondary channels, said pair of ledges for coupling said stationary basket member to said pair of rails;
   a pair of extension bars telescopically coupled to said pair of rails, said pair of extension bars being slidable within said pair of primary channels substantially across said length of said pair of rails and rearwardly therefrom;
   a moveable basket member having a front end portion and a rear end portion, said front end portion being pivotally coupled to said pair of extension bars, said rear end portion having at least one tab extending therefrom for inserting into said pair of secondary channels and coupling said moveable basket to said pair of rails;
   wherein the telescoping roof basket assembly is moveable between a roof mounted position and a back end mounted position;
   wherein the telescoping roof basket assembly in said roof mounted position includes said stationary basket member and said moveable basket member comprising a substantially continuous additive length, said continuous additive length for mounting an elongated item to the telescoping roof basket assembly.

2. The telescoping roof basket assembly of claim 1 wherein said moveable basket member is substantially straight thereby providing the telescoping roof basket assembly with a low profile when the telescoping roof basket assembly is in said roof mounted position.

3. The telescoping roof basket assembly of claim 1 wherein said pair of rails has a first pair of detents extending into said pair of primary channels, said first pair of detents for engaging said pair of extension bars and preventing said pair of extension bars from extending further rearwardly from said pair of rails.

4. The telescoping roof basket assembly of claim 3 wherein said pair of extension bars has a second pair of detents extending therefrom for engaging said first pair of detents and preventing said pair of extension bars from extending further rearwardly.

5. The telescoping roof basket assembly of claim 1 further comprising:

a plurality of leg portions for coupling said pair of rails to said roof, said plurality of leg portions including a rear pair of leg portions with a first pair of channels and a second pair of channels formed therein, said first pair of channels being aligned with said pair of primary channels and said second pair of channels being aligned with said pair of secondary channels.

6. The telescoping roof basket assembly of claim 5 further comprising:

a locking mechanism coupled to at least one of:

said pair of rails within one of said secondary channels; and said rear pair leg portions within said second pair of channels;

wherein said locking mechanism is intended to engage one of said pair of tabs extending from said moveable basket member and to secure said moveable basket member in said roof mounted position.

7. The telescoping roof basket assembly of claim 5 wherein said locking mechanism comprises a spring-loaded locking mechanism coupled to one of:

said pair of rails within one of said secondary channels; and said rear pair leg portions within said second pair of channels.

8. The telescoping roof basket assembly of claim 6 wherein said spring-loaded locking mechanism comprises a bracket that is coupled to a biasing member, said biasing member biasing said bracket to a closed position so as to prevent rearward movement of one if said pair of tabs and to secure the moveable rack member in said roof mounted position.

9. The telescoping roof basket assembly of claim 1 further comprising a modular component for attachment to said pair of rails via said pair of secondary channels.

10. The telescoping roof basket assembly of claim 1 wherein said continuous additive length said stationary basket member and said moveable basket member is substantially equal to said length of said pair of rails.

11. A telescoping roof basket assembly of for a vehicle, comprising:

a pair of rails fixedly coupled to a vehicle roof, said pair of rails having a pair of primary channels and a pair of secondary channels formed therein, said pair of primary channels extending substantially across a length of said pair of rails;

a stationary basket member having a pair of ledges extending therefrom for inserting into said pair of secondary channels, said pair of ledges utilized for coupling said stationary basket member to said pair of rails;

a pair of extension bars telescopically coupled to said pair of rails, said pair of extension bars being slidable within said pair of primary channels substantially across said length of said pair of rails and rearwardly therefrom;

a moveable basket member having a front end portion and a rear end portion, said front end portion being pivotally coupled to said pair of extension bars, said rear end portion having at least one tab extending therefrom for inserting into said pair of secondary channels and coupling said moveable basket to said pair of rails; and at least one modular component having a pair of protrusions for inserting into said pair of secondary channels and coupling said at least one modular component to said pair of rails;

wherein the telescoping roof basket assembly is moveable between a roof mounted position and a back end mounted position;

wherein the telescoping roof basket assembly in said roof mounted position includes said stationary basket member and said moveable basket member comprising a substantially continuous additive length, said continuous additive length for mounting an elongated item to the telescoping roof basket assembly.

12. The telescoping roof basket assembly of claim 11 wherein said continuous additive length of said stationary basket member and said moveable basket member is substantially equal to said length of said pair of rails.

13. The telescoping roof basket assembly of claim 11 wherein said at least one modular component comprises a cargo carrier, said cargo carrier comprising a base portion and a lid portion pivotally coupled to said base portion.

14. The telescoping roof basket assembly of claim 13 wherein said base portion of said cargo carrier has a pair of protrusions extending therefrom, said pair of protrusions for inserting into said pair of secondary channels and coupling said cargo carrier to said pair of rails.

15. The telescoping roof basket assembly of claim 11 wherein said pair of rails has a first pair of detente extending into said pair of primary channels, said first pair of detente for engaging said pair of extension bars and preventing said pair of extension bars from extending further rearwardly from said pair of rails.

16. The telescoping roof basket assembly of claim 11 wherein said pair of extension bars has a second pair of detents extending therefrom for engaging said first pair of detents and preventing said pair of extension bars from extending further rearwardly.

17. The telescoping roof basket assembly of claim 11 further comprising:

a plurality of leg portions for coupling said pair of rails to said roof, said plurality of leg portions including a mar pair of leg portions with a first pair of channels and a second pair of channels formed therein, said first pair of channels being aligned with said pair of primary channels and said second pair of channels being aligned with said pair of secondary channels.

18. The telescoping roof basket assembly of claim 11 further comprising:

a locking mechanism coupled to at least one of:

said pair of rails within one of said secondary channels; and said rear pair leg portions within said second pair of channels;

wherein said locking mechanism is intended to engage one of said pair of tabs extending from said moveable basket member and to secure said moveable basket member in said roof mounted position.

* * * * *